No. 891,249. PATENTED JUNE 23, 1908.
W. S. HAMM.
LAMP AND LANTERN.
APPLICATION FILED FEB. 18, 1907.
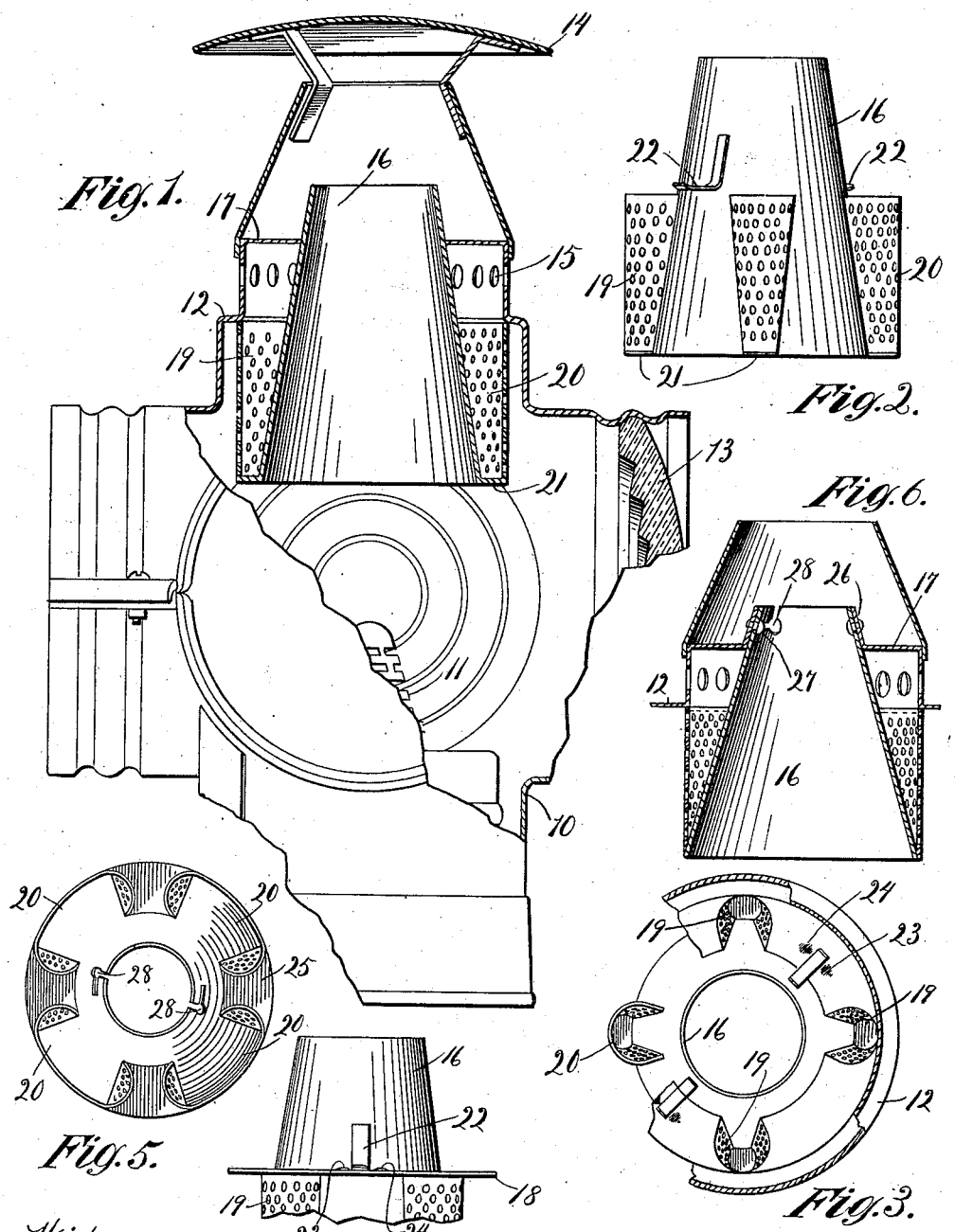

UNITED STATES PATENT OFFICE.

WILLIAM S. HAMM, OF LAKESIDE, ILLINOIS.

LAMP AND LANTERN.

No. 891,249.  Specification of Letters Patent.  Patented June 23, 1908.

Application filed February 18, 1907. Serial No. 357,940.

*To all whom it may concern:*

Be it known that I, WILLIAM S. HAMM, a citizen of the United States, and resident of Lakeside, county of Cook, and State of Illinois, have invented certain new and useful Improvements in Lamps and Lanterns, of which the following is a specification, and which are illustrated in the accompanying drawings, forming a part thereof.

The invention relates to oil-burning lamps and lanterns designed for use in railway service; and the object of the invention is to provide improved means for preventing such lamps from being extinguished by drafts and air currents to which they are exposed in use, and for preventing the deposit of moisture upon the inner surfaces of their walls.

The invention is exemplified in the structure to be hereinafter described and illustrated in the accompanying drawings, in which—

Figure 1 is a side elevation, partly in section, of a lamp constructed according to the invention; Fig. 2 shows in side elevation a removable flue employed in the lamp; Fig. 3 is a plan sectional view taken through the dome of the lamp; Fig. 4 shows a detail of the internal construction; Fig. 5 is a detail bottom plan view of a portion of the device showing a modified form of construction; and Fig. 6 is a detail vertical central section of the device illustrated in Fig. 5.

The body 10 of the lamp for inclosing the burner 11 may be of any convenient form having a dome 12. As shown it is of metal and is provided with a plurality of lateral openings 13, each covered by a lens. The dome 12 has an opening at its top for the escape of the products of combustion, and preferably this opening is covered by an elevated cap 14. For the admission of air to support combustion within the lamp, an annular series of circular apertures 15 is provided in the side walls of the dome about midway of its height.

A flue 16, preferably in the form of a truncated cone having its greatest diameter at its base, extends, from within the body 10 of the lamp over the burner 11, centrally into the dome 12 to a point above the openings 15 in its wall. Annular diaphragms 17, 18, located above and below the series of apertures 15 respectively, divide the space within the dome about the flue 16 to form a wind chest, the lower diaphragm, at 18, forming the bottom of the chest, being provided with a plurality of openings 19 leading to the body of the lamp through a chambered cap 20, covering each of the openings 19 from below and having foraminous walls. As shown, these caps take the form of lobes fixed to the outer wall of the flue 16, and they are conical in shape and extend downwardly from the diaphragm 18 to the base of the flue, their lower ends being closed by a flange 21 turned outwardly from the wall of the flue at its bottom.

To facilitate the cleaning of the lamp the flue 16, with the lobes 20 formed thereon, is removable, being normally held in place within the lamp by spring fingers 22 projecting from its wall and bearing upon the diaphragm 18. In removing the flue it is turned on its axis to bring the spring fingers 22 into register with the openings 19 of the diaphragm 18, and is then withdrawn downwardly from the dome 12. Preferably a pair of bosses 23, 24, struck up from the diaphragm 18, engage each of the spring fingers 22 at either side when the flue has been turned to its seat, to prevent the parts from being accidentally displaced.

In use, air for supporting combustion finds its way to the burner 11 within the body of the lamp through the apertures 15 in the wall of the dome 12, being directed upon the inner surface of the walls of the lamp body by the minute openings in the lobes 20 which cover the openings 19 in the floor of the wind chest. It thus displaces the moisture-laden vapors emitted from the burner, and these vapors pass directly to the flue 16 and out of the lamp for maintaining the draft necessary to combustion under all conditions.

If desired the diaphragm 18 as a part of the dome may be dispensed with, the interspaces between the upper ends of adjacent lobes 20 being closed by plates 25 secured to such lobes and the central flue 16 by solder or other suitable means, as shown in Fig. 5. The device may be further modified as to the means for securing the central flue 16 in place, as shown in Figs. 5 and 6, wherein the upper diaphragm 17 is shown as provided with an upstanding, tapering, annular flange 26, within which the upper end of the flue fits. This flange 26 is provided with one or more instanding headed studs 27, and there is formed in the flue one or more segmental slots 28, united at one end to receive the head of the stud. As the flue is thrust upwardly to its seat within this flange the head of the stud 27 will enter the enlarged portion of the slot, and the flue being then turned to bring the contracted portion of the slot into engagement with the stud, the parts are securely locked together. These studs and slots are so located that when brought into engagement the upper ends of the lobes 20 contact with the base of the dome 12.
I claim as my invention—

1. In a lantern, in combination, a body, a dome having lateral air induction ports, an annular diaphragm above the ports, an annular apertured diaphragm below the ports, a flue member tapering upwardly throughout its length, fitted in the central apertures of the diaphragms, hollow downwardly tapering lobes having foraminous walls arranged annularly upon the outer walls of the flue member and leading down from the apertures in the lower diaphragm.

2. In a lantern, in combination, a body, a dome having lateral air induction ports, an annular diaphragm above the ports, an annular apertured diaphragm below the ports, a flue member tapering upwardly throughout its length; fitted removably in the central apertures of the diaphragms, hollow downwardly tapering lobes having foraminous walls arranged annularly upon the outer walls of the flue member and leading down from the apertures in the lower diaphragm.

WILLIAM S. HAMM.

Witnesses:
P. G. EMERY,
F. W. FOEHRINGER.